US007266552B2

(12) United States Patent
Schwartz et al.

(10) Patent No.: US 7,266,552 B2
(45) Date of Patent: Sep. 4, 2007

(54) ACCESSING A DATASET USING AN UNSUPPORTED ACCESS METHOD

(75) Inventors: David R. Schwartz, Morgan Hill, CA (US); Bryan Frederick Smith, Morgan Hill, CA (US); James Z. Teng, San Jose, CA (US); David Warner, Spring, TX (US)

(73) Assignees: International Business Machines Corporation, Armonk, NY (US); Rocket Software, Inc., Newton, MA (US)

( * ) Notice: Subject to any disclaimer, the term of this patent is extended or adjusted under 35 U.S.C. 154(b) by 455 days.

(21) Appl. No.: 10/821,717

(22) Filed: Apr. 9, 2004

(65) Prior Publication Data

US 2004/0210581 A1 Oct. 21, 2004

Related U.S. Application Data

(60) Provisional application No. 60/463,588, filed on Apr. 17, 2003.

(51) Int. Cl.
G06F 7/00 (2006.01)
G06F 17/30 (2006.01)
G06F 17/00 (2006.01)

(52) U.S. Cl. ............... 707/4; 707/5; 707/101

(58) Field of Classification Search ............ 707/1–100, 707/200 S; 711/100 S
See application file for complete search history.

(56) References Cited

U.S. PATENT DOCUMENTS

| 4,706,212 | A | | 11/1987 | Toma ................... 364/900 |
| 5,930,824 | A | * | 7/1999 | Anglin et al. ............ 711/162 |
| 6,070,224 | A | | 5/2000 | LeCrone et al. .......... 711/112 |
| 6,341,329 | B1 | | 1/2002 | LeCrone et al. .......... 711/112 |
| 6,415,300 | B1 | * | 7/2002 | Liu ........................ 707/204 |
| 6,625,704 | B2 | | 9/2003 | Winokur .................. 711/162 |
| 2004/0128299 | A1 | * | 7/2004 | Skopec et al. ............ 707/100 |

OTHER PUBLICATIONS

"2.7.8 Extended Format Sequential Data Sets", "DFSMS/MVS V1R5 Planning for Installation" IBM Library server, Copyright IBM Corp 1979, 1999.*
Cuthill, Ian M., "York APL-TOTAL Database Interface," International Conference on APL, Proceedings of the Eighth International Conference on APL, 1976, Ottawa, Canada, pp. 87-94.
Pryor, Steve, "Storage Strategies: Extending Your Reach: Extended-Format Datasets," Technical Support, Jan. 2002, Technical Enterprises Inc., [online] Retrieved from: <URL: http://www.naspa.com/PDF/2002/0102%20PDF/T0201008.pdf>.

(Continued)

Primary Examiner—John Cottingham
Assistant Examiner—Dennis Vautrot

(57) ABSTRACT

A method, apparatus, and article of manufacture accesses a dataset using an unsupported access method. A first request to access a dataset is intercepted. The first request is associated with a first data structure that specifies a first access method. The first data structure is replaced with a second data structure that specifies a second access method which is different from the first access method. The dataset is accessed in accordance with the second access method of the second data structure.

In another particular embodiment, the first access method is the basic direct access method, and the second access method is any of the basic sequential access method and the queued sequential access method. In yet another embodiment, the dataset is an extended format physical sequential dataset.

32 Claims, 14 Drawing Sheets

OTHER PUBLICATIONS

Carmine A. Cannatello, "Advanced Assembler Language and MVS Interfaces, For IBM Systems and Application Programmers," Second Edition, 1999, pp. 377-378, 457-501.

Dave Loveluck, Xephon Archives, "Unload, invoke IDCAMS, and reload a DSDS," [online] Copyright 1993, [retrieved on: Apr. 4, 2004] Retrieved from: <URL: http://www.xephon.com/arcinframe.php/a009a05>.

"QSAM—Queued Seque," [online] Copyright 1991, [retrieved on: Apr. 4, 2004] Retrieved from: <URL: http://www.freeusp.org/Arco/Data/sparc/fgqsam>.

"2.7.8 Extended Format Sequential Data Sets", "DFSM/MV V1R5 Planning for Installation" IBM Library Server [online] Copyright IBM Corp. 1979, 1999, [retrieved on Apr. 7, 2004] Retrieved from: <URL: http://publibz.boulder.ibm.com/cgi-bin/bookmgr_OS390/BOOKS/DGT1P108/2.7.8?SHELF=DGT1BK2A&DT=1999011517248>.

"3.7.10 Characteristics of Non-VSAM Extended Format Data Sets", "DFSMS/MVS V1R5 Using Data Sets" IBM Library Server [online] Copyright IBM Corp. 1979, 1999, [retrieved on Apr. 7, 2004] Retrieved from: <URL: http://publibz.boulder.ibm.com/cgi-bin/bookmgr_OS390/BOOKS/DGT1D405/3.7.10?SHELF=DGT1BK2A&DT=19990106110554>.

"MVS Low-Level I/O Functions: Direct BSAM Interface Functions," Copyright 2001 by SAS Institute Inc., Cary, NC, USA, [online] [retrieved on: Apr. 4, 2004] Retrieved from: <URL: http://support.sas.com/documentation/onlinedoc/sasc/doc700/html/lr2/zr2mvsfb.htm>.

"UCS User's JCL Guide, DD DCB, DD DCB parameter," [online]. [Retrieved on Nov. 5, 2003]. Retrieved from the Internet: <URL: http://www.system.missouri.edu/itss/ss/guides/jcl/dddcb.html>.

"1.2.1.2.3 DB2 UDB for OC/390 and z/OS V7 Administration Guide," IBM Library Server. [online], © 1982, 2001, [Retrieved on Jul. 5, 2004]. Retrieved from the Internet: <URL: http://publib.boulder.ibm.com/cgi-bin/bookmgr/BOOKS/dsnagh11/1.2.1.2.3?SHELF=dsnshh11&DT=20020823131906&FS=FALSE>.

"MVS . . . a long history: OS/360," [online], [Retrieved on: Jul. 5, 2004] Retrieved from the Internet: <URL: http://www.os390-mvs.freesurf.fr/mvshist1.htm>.

"CS271 Lecture 10", [online], [Retrieved on Jul. 5, 2004]. Retrieved from the Internet: <URL: http://www.cs.uregina.ca/links/class-info/271/lecture10/CS271_lecture10.doc>.

"Virtual Storage Access Method," [online], Aug. 21, 2003 [Retrieved on Jul. 5, 2004]. Retrieved from the Internet: <URL: http://jaymoseley.com/hercules/vstutor.htm>.

"MVS Low-Level I/O Functions: The Record-Oriented BSAM Interface," [online], © 2001 by SAS Institute Inc., Cary, NC, USA. [Retrieved on Nov. 2, 2003], Retrieved from the Internet: <URL: http://support.sas.com/documentation/onlinedoc/sasc/doc700/html/lr2/z2mvsrec.htm>.

"MVS Low-Level I/O Functions: DCBs and DCB Exit Routines," [online], © 2001 by SAS Institute Inc., Cary, NC, USA. [Retrieved on Nov. 2, 2003], Retrieved from the Internet: <URL: http://support.sas.com/documentation/onlinedoc/sasc/doc700/html/lr2/z2mvsdcb.htm>.

"MVS Low-Level I/O Functions: Introduction," [online], © 2001 by SAS Institute Inc., Cary, NC, USA. [Retrieved on Nov. 2, 2003], Retrieved from the Internet: <URL: http://support.sas.com/documentation/onlinedoc/sasc/doc700/html/lr2/z2mvsin.htm>.

Tom Bryant, "System Strategies MVS/XA/ESA Problem Solving: Part IV—SLIP Traps and GTF Tracing," [online], Technical Support, Jan. 1997, Technical Enterprises Inc. [Retrieved on Jul. 17, 2004] Retrieved from the Internet: <URL: http://www.naspa.com/PDF/97/T9701004.pdf>.

"IBM DB2 Archive Log Compression Tool for z/OS, User's Guide, Version 1 Release 1" [online], Third Edition, Jan. 2002, [Retrieved on Dec. 3, 2004] Retrieved from the Internet: <URL: http://www.publib.boulder.ibm.com/epubs/pdf/alcuga12.pdf>, Publication No. SC27-1187-02.

"DFSMS/MVS Version 1 Release 5, General Information," Seventh Edition, Publication No. GC26-4900-06, International Business Machines Corporation, Mar. 1999.

"DFSMS/MVS Version 1 Release 5, Implementing System-Managed Storage," Sixth Edition, Publication No. SC26-3123-05, International Business Machines Corporation, Mar. 1999.

"OS/390 MVS Programming: Authorized Assembler Services Guide," Eighth Edition, Publication No. GC28-1763-07, International Business Machines Corporation, Jun. 1999.

"DFSMS/MVS Version 1 Release 5, DFSMSdfp Storage Administration Reference," Sixth Edition, Publication No. SC26-4920-05, International Business Machines Corporation, Mar. 1999.

* cited by examiner

ACCESSING A DATASET USING AN UNSUPPORTED ACCESS METHOD

The present application claims priority to U.S. Provisional Patent Application Ser. No. 60/463,588, titled, "Archive Log Accelerator," filed on Apr. 17, 2003, which is incorporated herein by reference in its entirety for all purposes.

BACKGROUND OF THE INVENTION

1. Field of the Invention

The invention relates generally to accessing a dataset, and more particularly to accessing a dataset using an unsupported access method.

2. Description of the Related Art

In a computer system, databases allow a user to store and access data quickly and conveniently. The data in a database is stored in one or more tables. Typically, the computer system stores the data as records in a table and the table is stored as a dataset on a hard disk drive. A dataset is also referred to as a file. Although disk drives can store large amounts of data, disk drives still have a limited amount of storage space. Datasets are also allocated a maximum amount of space for storing data. To prevent a dataset from running out of space, some databases store portions of the data of a dataset in archive storage. Accessing data in archive storage is typically slower than accessing data on a hard disk drive.

A log is a collection of records that describe the events that occur during database execution and that indicate the sequence of the events. The log is used to recover from a failure during database execution. An active log is a portion of the database log to which log records are written as they are generated, in particular, the log records are written when committed. An archive log is a portion of the database log that contains log records that have been copied from an active log. The active log contains the most recent log records, and the archive log contains those log records that are older and no longer fit in the active log.

Archive logs consume a large amount of storage and can create storage problems. Typically archive logs are stored on tape. Reading data from the archive logs can be time consuming, especially when waiting for a device to become available.

Some applications have such a high volume of transactions that archiving cannot keep pace with the rate at which transactions are logged. If archiving cannot keep pace with the active logging rate, then the database management system may halt until records containing the transactions are written to the archive log.

Data striping is a technique that distributes the data records of a dataset across multiple system-managed volumes, where each volume is a separate disk drive. When data is written to a striped dataset, the data is interleaved among the stripes. The system distributes the records in each of the stripes in such a way that the volumes can be read from or written to simultaneously, thereby reducing the amount of time to read and write data and improving performance.

One database management system, the IBM® DB2® (IBM and DB2 are registered trademarks of International Business Machines Corporation) database management system, uses the basic direct access method for writing data to and reading data from archive logs. In one storage system, data striping requires extended format physical sequential datasets. However, extended format physical sequential datasets are accessed using another access method which may be the basic sequential access method (BSAM) or the queued sequential access method (QSAM). Because the database management system's archive logs use the basic direct access method (BDAM) which does not support extended format physical sequential datasets, data striping cannot be used with conventional DB2 archive logs.

Therefore, there is a need for a technique to access a dataset using an unsupported access method. In particular, this technique should allow an extended format physical sequential dataset to be accessed using the basic direct access method.

SUMMARY OF THE INVENTION

To overcome the limitations in the prior art described above, and to overcome other limitations that will become apparent upon reading and understanding the present specification, various embodiments of a method, apparatus, and article of manufacture for accessing a dataset using an unsupported access method are disclosed.

In one embodiment, an open request to access a dataset is intercepted. The open request is associated with a first data structure that specifies a first access method. The first data structure is replaced with a second data structure that specifies a second access method which is different from the first access method. The dataset is accessed in accordance with the second access method of the second data structure.

In another more particular embodiment, the first access method is the basic direct access method, and the second access method is any of the basic sequential access method and the queued sequential access method. In yet another embodiment, the dataset is an extended format physical sequential dataset.

In this way, a dataset can be accessed using an unsupported access method. In particular, an extended format physical sequential dataset can be accessed using the basic direct access method.

BRIEF DESCRIPTION OF THE DRAWINGS

The teachings of the various embodiments of present invention can be readily understood by considering the following detailed description in conjunction with the accompanying drawings, in which.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to access a dataset using an unsupported access method. In some embodiments, an extended format physical sequential dataset is accessed from a request that specifies the basic direct access method.

In one embodiment, an open request to access a dataset is intercepted. The open request is associated with a first data structure that specifies a first access method. The first data structure is replaced with a second data structure that specifies a second access method which is different from the first access method. The dataset is accessed in accordance with the second access method of the second data structure. In a more particular embodiment, the first access method is the basic direct access method, and the second access method is any of the basic sequential access method and the queued sequential access method. In another more particular embodiment, the first and second data structures are first and second data control blocks, respectively.

Figure 1:
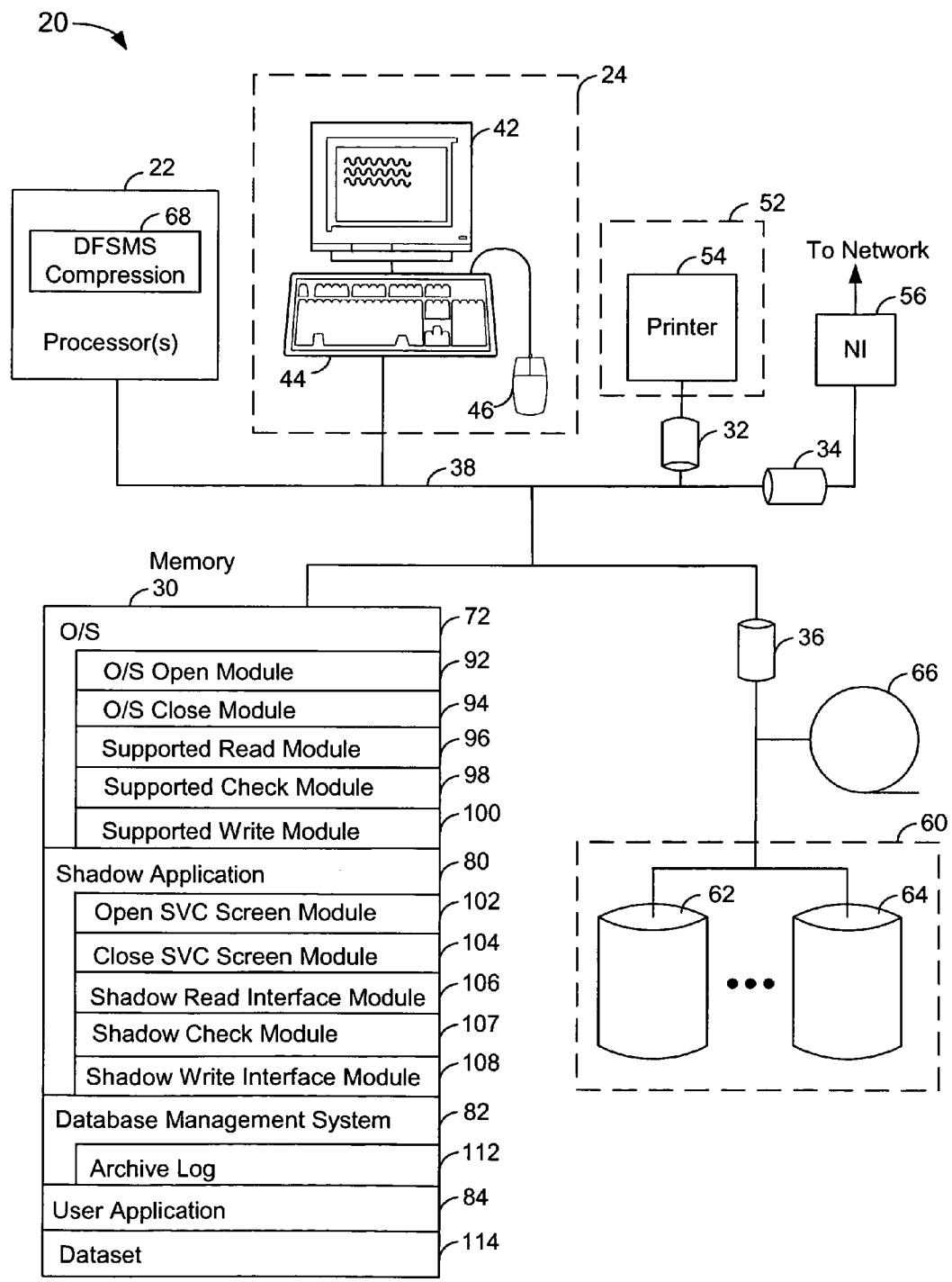
FIG. 1 depicts an illustrative computer system that uses the teachings of various embodiments of the present invention.

FIG. 1 depicts an illustrative computer system 20 that utilizes the teachings of various embodiments of the present invention. The computer system 20 comprises one or more processors 22, a console 24, memory 30 and first, second and third channels 32, 34 and 36, respectively, all conventionally coupled by one or more busses 38. The console 24 has a display 42, a keyboard 44 and mouse 46.

The first channel 32 provides a communications path to an output device 52, for example, a printer 54. A second channel 34 provides a communications path to a communications interface 56. The communication interface 56 is a network interface (NI) that allows the computer 20 to communicate via a network, for example, the Internet. The communications interface 56 may be coupled to a network transmission line comprising a transmission medium such as, for example, twisted pair, coaxial cable or fiberoptic cable. In another exemplary embodiment, the communications interface provides a wireless interface, in other words, the transmission medium is wireless.

The third channel 36 provides a communications path to a disk subsystem 60 having a predetermined number N of disks 62-64. The disk subsystem 60 is used, at least in part, to store archived data using striping. The datasets storing the archived data are extended format physical sequential datasets. Alternately, the third channel is also coupled to a tape drive 66.

DFSMS® (Registered trademark of International Business Machines Corporation) compression is a type of data compression provided by DFSMS/MVS® (Registered trademark of International Business Machines Corporation) that uses a hardware-based compression facility 68 of a processor 22. DFSMS compression can be used to reduce the size of a stored dataset. In addition, DFSMS compression works with extended format physical sequential datasets. In an alternate embodiment, DFSMS compression hardware 68 is not provided.

The memory 30 generally comprises different modalities, illustratively semiconductor memory, such as, for example, random access memory (RAM), and disk drives. In some embodiments, the memory 30 stores an operating system 72, a shadow application 80, a database management system 82 and a user application 84. Typically, the shadow application 80 implements an embodiment of the present inventive technique. The shadow application 80 is invoked when the user application 84 attempts to read from or write to a dataset.

In various embodiments, the operating system (O/S) 72 may be the IBM z/OS® (z/OS is a registered trademark of International Business Machines Corporation) operating system, which may also be referred to as the multiple virtual system (MVS™ (Trademark of International Business Machines Corporation)) operating system. In some more particular embodiments, the operating system is MVS/ESA™ (Trademark of International Business Machines Corporation). However, the operating system 72 is not meant to be limited to z/OS or MVS/ESA. In other embodiments, other operating systems 40 can be used. The operating system 72 provides an O/S open module 92 to open a dataset and an O/S close module 94 to close a dataset. The operating system also has supported read, check and write modules, 96, 98 and 100, which are invoked to read from, check whether an operation completed, and write to a data set, respectively.

Typically, the shadow application 80 comprises an open SVC screen module 102, a close SVC screen module 104, a shadow read interface module 106, a shadow check module 107 and, in some embodiments, a shadow write interface module 108. The shadow application 80 will be described in further detail below.

The database management system 82 updates a dataset that acts as an archive log 112. When the user application attempts to read the archive log 112 using a user-application specified non-supported access method, the shadow application 80 is typically invoked to read the archive log 112 using a supported access method. In some embodiments, the database management system is DB2. However, the present inventive technique is not meant to be limited to datasets updated by DB2, and may be used with datasets updated by other database management systems. In addition, the present inventive technique is not limited to being applied to datasets used with database management systems, and may be applied to any dataset. Furthermore, the user application 84 is not meant to be limited to reading an archive log, and may read from, or alternately write to, substantially any dataset 114 using an unsupported access method.

The user of the user application is typically a systems programmer, applications programmer or database administrator. The user typically communicates with the user application by means of the console 24.

An embodiment of the present inventive technique is typically incorporated in the shadow application 80. Typically an embodiment of the shadow application 80 is tangibly embodied in a computer-readable device, carrier or medium, for example, memory 30, and is comprised of instructions which, when executed, by the one or more processor(s) 22 of the computer system 20, causes the computer system 20 to utilize an embodiment of the present invention.

Various embodiments of the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. The article of manufacture in which the code is implemented also comprises transmission media, such as a network transmission line and wireless transmission media. Therefore the article of manufacture also comprises the medium in which the code is embedded. Those skilled in the art will recognize that many modifications may be made to this configuration without departing from the scope of the present invention.

The exemplary computer system illustrated in FIG. 1 is not intended to limit the present invention. Other alternative hardware environments may be used without departing from the scope of the present invention.

Various embodiments of the present inventive technique will be described with respect to a z/OS or MVS operating system environment. However, the various embodiments of the present inventive technique are not meant to be limited to the z/OS or MVS operating system environment and may be used in other operating system environments.

Figure 2:
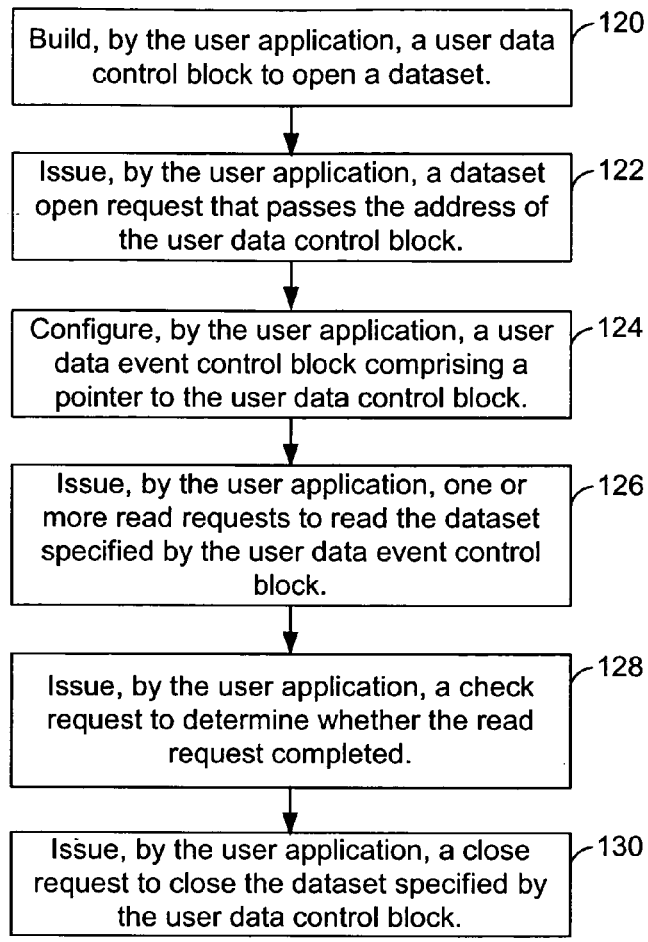
FIG. 2 depicts a high-level flowchart of a conventional technique to read a dataset from a user application.

FIG. 2 depicts a high-level flowchart of a user application when reading a dataset in a conventional manner. To access a dataset, the dataset is associated with a data structure called a data control block. In step 120, the user application builds a user data control block to open a dataset. In some embodiments, the operating system provides instructions to create a data control block and to allow a user or an application to modify the data control block. For example, in the z/OS operating system, the user application builds a data control block using a data control block macro instruction. The application may complete the data control block at execution time. For example, the z/OS operating system maintains a data control block for each dataset in use by a user's program. The data control block contains information associated with and/or describing a dataset. The data control block contains dataset description information such as the type of access method to use to access the dataset, the dataset organization, and processing options. A dataset may be opened for reading or writing, which is also specified in the data control block. The dataset organization comprises any of the following: direct access, direct access unmovable, indexed sequential, indexed sequential unmovable, partitioned organization, partitioned organization unmovable, physical sequential and physical sequential unmovable. For BDAM, the dataset organization indicates direct access. For BSAM or QSAM, the dataset organization indicates physical sequential. An application program can modify parameters and addresses in the data control block during execution.

In step 122, the user application issues a dataset open request to attach to the dataset. In the open request, the user application passes the address of the user data control block as an argument to specify the dataset.

A supervisor call (SVC) refers to an operating system service that may be invoked by an application to perform an act. The term supervisor refers to a mode, that is, the supervisor mode, in which the call is executed. For example, in the z/OS operating system, a dataset open request may be an SVC 19 (OPEN) or an SVC 22 (OPEN TYPE=J) instruction. A dataset may be opened for reading or writing. Using conventional techniques, when the dataset open is complete, the data control block will contain an address of an operating system read module or an operating system write module that will be invoked when a read or a write request, respectively, is issued. The address of the operating system read module is in a read address in the data control block. In an alternate embodiment, the address of the operating system write module is in a write address in the data control block. The operating system read and write modules access a dataset using the access method specified in the data control block. The data control block will also contain an address of an operating system check module, in a check address. The operating system check module will be invoked when a check request is issued. The operating system check module will be used to determine if the read or write request completed successfully.

In step 124, the user application configures a user data event control block which has an address of, that is, a pointer to, the user data control block.

In step 126, the user application issues one or more read requests to read the dataset passing the address of the user data event control block as an argument. In particular, the user application invokes the operating system read module specified by the read address in the data control block.

In step 128, the user application issues a check request to determine whether the read request completed. In particular, the user application invokes the operating system check module that is specified by the check address in the data control block.

The user application may issue one or more read requests, and steps 126 and 128 may be repeated.

After the user application retrieves a desired amount of data, in step 130, the user application issues a close request passing the address of the user data control block as an argument to close the dataset associated with the user data control block.

In various embodiments, the shadow application allows a user application to access a dataset using an unsupported access method. The shadow application is installed and executed, and the user application remains unchanged.

Figure 3:
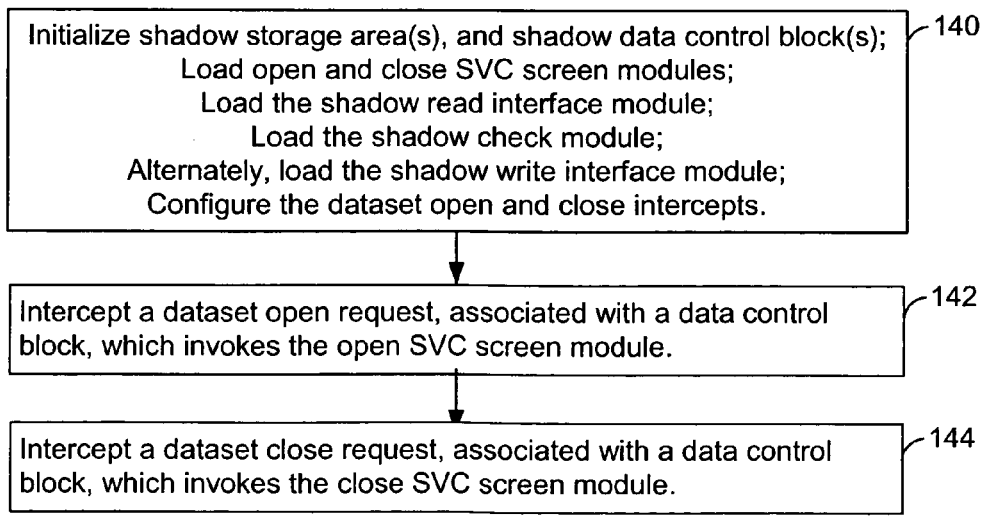
FIG. 3 depicts a high-level flowchart of an embodiment of a technique used in a shadow application of FIG. 1.

FIG. 3 depicts a high-level flowchart of an embodiment of the shadow application of FIG. 1. In step 140, after the shadow application is invoked, the shadow application initializes storage area(s) comprising a shadow services block and shadow control block(s). The shadow control blocks comprise at least one replacement data control block and at least one shadow data event control block.

The shadow application typically loads the open and close supervisor call (SVC) screen modules, the shadow read interface module, the shadow check module and in some embodiments, loads the shadow write interface module. Alternately, the shadow read interface module is not loaded, and the shadow write interface module is loaded.

Typically, the shadow application invokes an operating system facility to effectively insert the SVC screen modules in the path between the SVC instruction and the associated operating system SVC module. For example, the shadow application invokes the SVCUDPTE facility provided by the z/OS operating system. After the SVC screen module is inserted, the resulting body of code comprises the open SVC screen module and the operating system SVC module.

In some embodiments, the shadow application loads an open SVC 19 screen module which is effectively inserted in front of the operating system SVC 19 module. The open SVC 19 screen module is invoked when an SVC 19 is executed to open a dataset associated with a specified data control block. In other embodiments, the shadow application loads an open SVC 22 screen module which is effectively inserted in front of an operating system open SVC 22 module to provide an open SVC 22 screen module. The open SVC 22 screen module is invoked when an SVC 22 is executed to open a dataset with open type equal to "J". The open SVC 19 and open SVC 22 screen modules are generally referred to as the open SVC screen modules. The shadow application loads a close SVC screen module, and more particularly, a close SVC 20 screen module, which is effectively inserted in front of the operating system close SVC 20 module. The SVC 20 close screen module is invoked when an SVC 20 is executed to close a dataset associated with a specified data control block. The shadow application completes the loading of the SVC screen module by installing the open and close SVC screen modules using the z/OS SVCUDPTE facility.

In various embodiments, the shadow application also receives a user-specified qualifier that will be used to qualify a dataset for replacing the data control block.

The shadow application configures the operating system to intercept dataset open and close requests, and invoke the open and close SVC screen modules, respectively.

In step 142, the operating system intercepts the user dataset open request from the user application and invokes the open SVC screen module. The user dataset open request comprises an address of a user data control block as an argument which the operating system passes to the open SVC screen module. In step 144, the operating system intercepts a user dataset close request and invokes the close SVC screen module. The user dataset close request comprises an address of a data control block as an argument which the operating system passes to the close SVC screen module.

Figure 4:
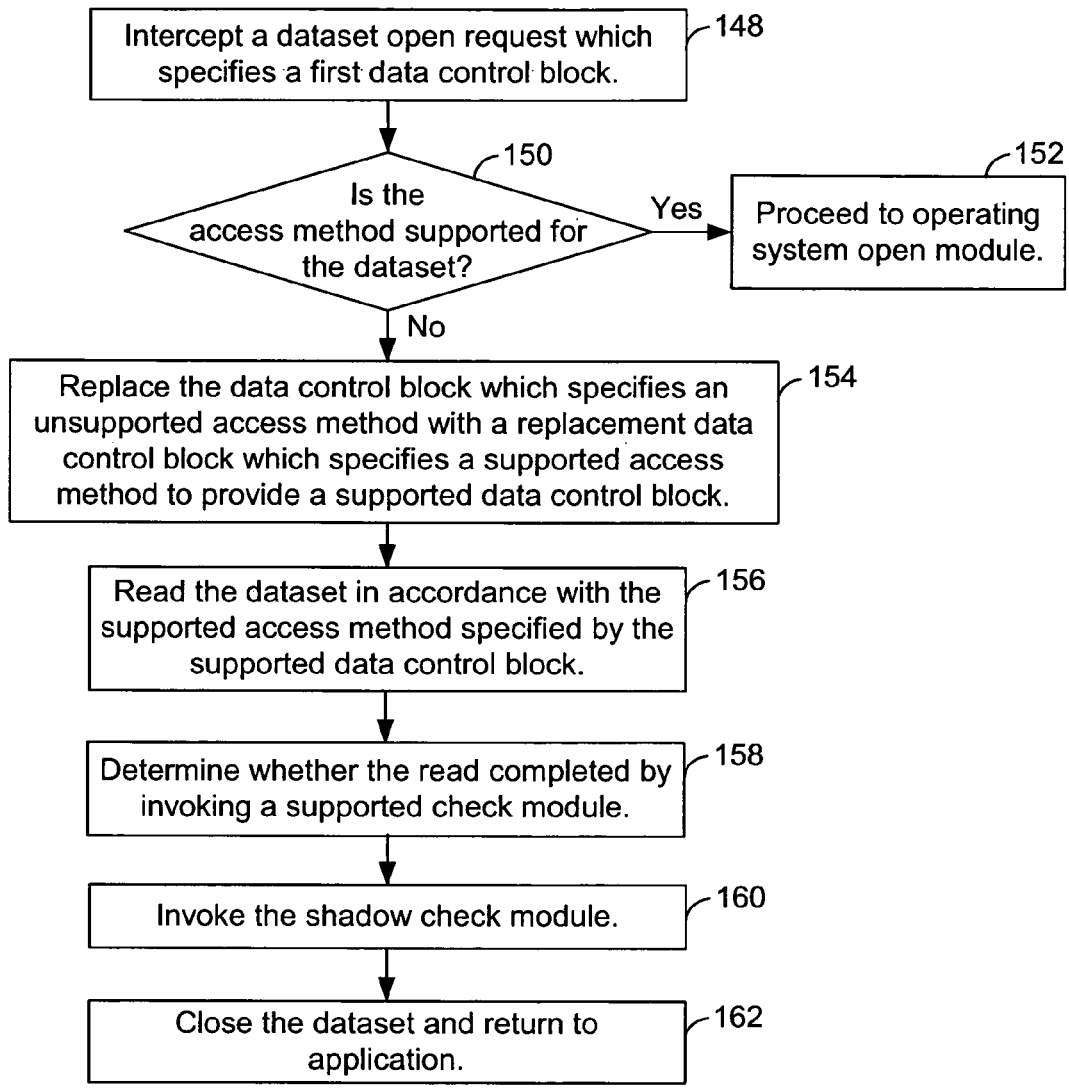
FIG. 4 depicts a flowchart of an embodiment of the initiation of the shadow application and the interception of the dataset open and close requests of FIG. 1.

FIG. 4 depicts a high-level flowchart of an embodiment of the present inventive technique used in the shadow application of FIG. 1. When a user requests that data be read from a dataset, the user application issues a user dataset open request, passing the address of the user data control block which specifies that dataset. In this example, the user data control block specifies an access method that is not supported for the type of dataset. In step 148, the operating system intercepts the dataset open request from the user application, and invokes the open SVC screen module, passing the address of the user data control block to the open SVC screen module. In step 150, the open SVC screen module determines whether the access method specified in the user data control block is supported for the dataset type. When the access method is supported, in step 152, the open SVC screen module proceeds to the operating system dataset open module to perform the open using conventional processing. When, in step 150, the open SVC screen module determines that the access method is not supported for that dataset, in step 154, the open SVC screen module replaces the user data control block with a replacement data control block that specifies an access method that supports the dataset type. The replacement data control block is copied to the same memory location(s) as the user data control block, and the copy is now referred to as a supported data control block. In some embodiments, the user data control block specifies an access method which does not support extended format physical sequential datasets, and the supported data control block specifies an access method which supports extended format physical sequential datasets.

After the dataset open request completes, the user application issues a read request to read the dataset, passing an address of a user data event control block as an argument. Because the user data control block has been replaced, the user data event control block contains the address of, or pointer to, the supported data control block. In step 156, in response to the read request from the user application, the shadow read interface module of the shadow application reads the dataset using the access method specified in the supported data control block. In step 158, the shadow application determines if the read completed by invoking a supported check module.

The user application may issue any number of read requests. For each read request, the shadow application will read the dataset using the access method specified in the supported data control block.

After performing a read, the user application issues a check request to determine whether the read completed. In step 160, the shadow check module is invoked.

After reading a desired amount of data, the user application issues a dataset close request to close the dataset. The address of the supported data control block is passed as an argument to the dataset close request. In step 162, the operating system intercepts the dataset close request and executes the close SVC screen module. When the shadow read interface module was used to read the data, the close SVC screen module frees up any additional memory that was allocated for use in the shadow application and proceeds to the conventional operating system close module to close the dataset associated with the supported data control block.

In various embodiments, the open SVC screen module implements steps 150 and 154, and the shadow read interface module implements steps 156 and 158.

Figure 5:
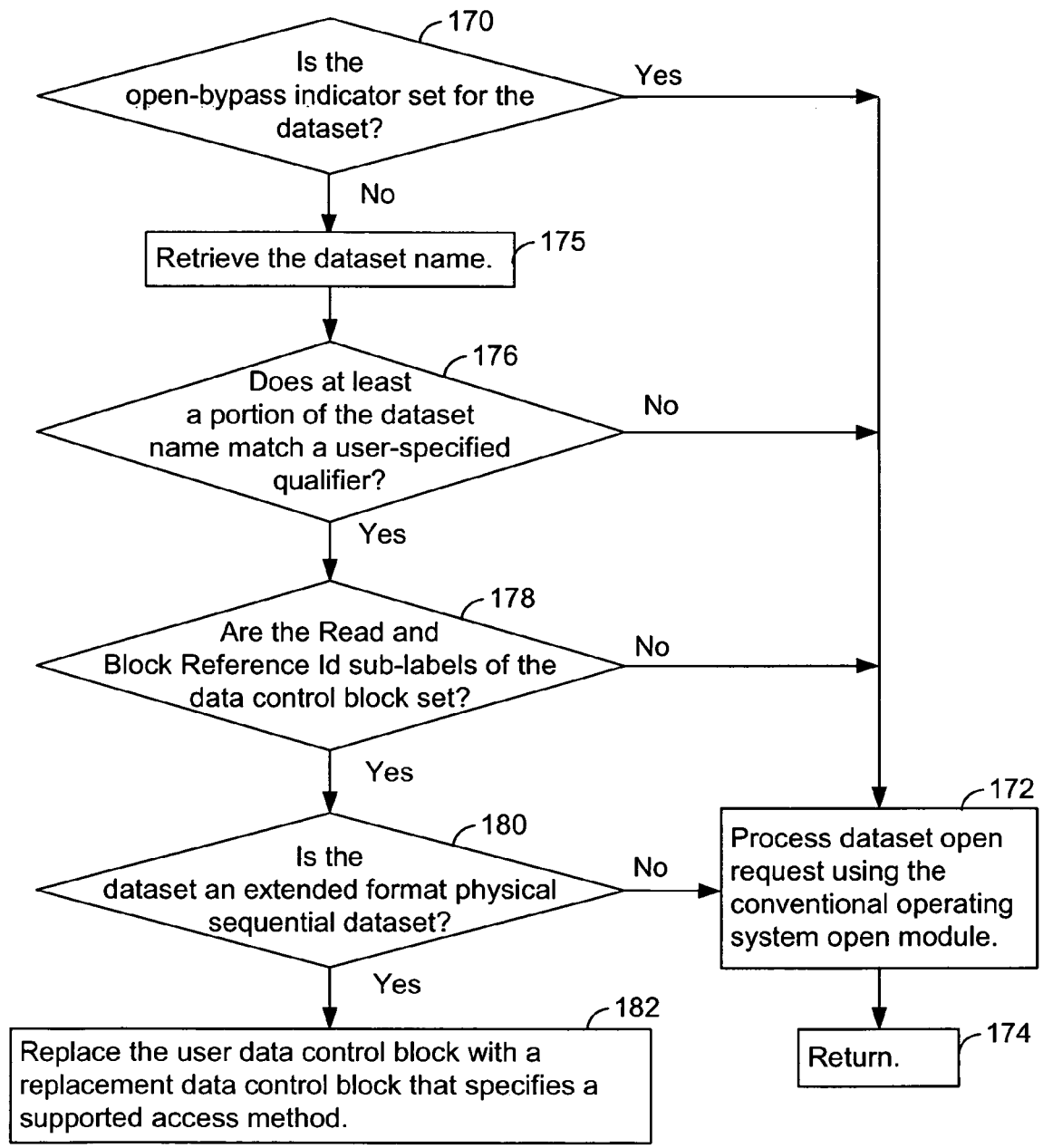
FIG. 5 depicts a more-detailed flowchart of an embodiment of an open SVC screen module of the shadow application of FIG. 1.

FIG. 5 depicts a flowchart of an embodiment of the open SVC screen module of FIG. 1. When the user application issues a dataset open request, the open SVC screen module receives the address of the user data control block. In step 170, the open SVC screen module determines if an open-bypass indicator is set for the dataset associated with the data control block. The purpose of the open-bypass indicator is to allow the open SVC screen module to recognize that the open SVC screen module has issued a dataset open request. When the open SVC screen module determines that the open-bypass indicator is set, in step 172, the open SVC screen module processes the dataset open request using the conventional operating system dataset open module. In step 174, the open SVC screen module returns to the calling module.

In some embodiments, the open-bypass indicator is stored in a predetermined location in memory that is accessible to SVC calls and to the shadow read interface module, and in some embodiments, the shadow write interface module. The open-bypass indicator has a distinct value that indicates that the open SVC screen module is to proceed to the operating system open module.

When the open-bypass indicator is not set, a dataset open request has not been issued by the open SVC screen module, and a user may be attempting to access a dataset using an unsupported access method. In steps 175-180, the open SVC screen module qualifies the dataset. In other words, the open SVC screen module determines whether the user data control block should be replaced. In step 175, the open SVC screen module retrieves the dataset name. The open SVC screen module retrieves the dataset name by interrogating at least one address pointer that is passed to the open SVC screen module on entry, and in some embodiments, retrieves the dataset name from a job file control block.

In step 176, the open SVC screen module determines whether at least a portion of the dataset name matches the user-specified qualifier. In some embodiments, the user-specified qualifier is a particular dataset name. In other embodiments, the user-specified qualifier is a prefix, that is, an initial set of characters in the dataset name; alternately, the user-specified qualifier is a suffix, that is, an ending set of characters in the dataset name. In another embodiment, step 176 is omitted.

When, in step 176, at least a portion of the dataset name matches the user-specified qualifier, in step 178, the open SVC screen module tests the data control block to determine if two sub-labels in the DCBMACR1 field, a read and a BDAM block identifier, DCBMRRD and DCBMRRI, respectively, are set. The DCBMRRD sub-label indicates whether the open is requesting that the dataset be opened for reading. The DCBMRRI sub-label indicates whether the open is requesting that BDAM relative block addressing be used. In other words, these two sub-labels are tested to determine if the data control block indicates that a dataset is to be read using BDAM. In some embodiments, the sub-labels comprise one or more bits. In other embodiments, a sub-label is checked to determine if an access method other than BDAM is being requested so that the user data control block can be replaced with a different access method.

When the READ and BDAM BLOCK ID sub-labels are set, in step 180, the open SVC screen module determines whether the dataset type is extended format physical sequential. When a dataset is created, the operating system constructs a dataset control block which describes the physical characteristics of the dataset. The open SVC screen module accesses the dataset control block for the dataset, for example, using an operating system application programming interface (API), to determine if the dataset is extended format physical sequential. However, in other embodiments, the present inventive technique may be applied to dataset types other than extended format physical sequential.

When step 180 determines that the dataset is extended format physical sequential, the dataset is qualified, and in step 182 the user data control block is replaced with a replacement data control block which specifies a supported access method. The replacement data control block, which is copied over the user data control block, is now referred to as a supported data control block.

In some embodiments, the user data control block specifies that a dataset is accessed using the basic direct access method (BDAM), and the supported data control block specifies that a dataset is accessed using any one of the basic sequential access method (BSAM) and the queued sequential access (QSAM) method. However, the present invention is not meant to be limited to BDAM, BSAM and QSAM, and various embodiments of the present invention may be used to replace a specified access method with a different access method.

When, in step 176, the open SVC screen module determines that the dataset name does not match the user-specified qualifier, in step 172, the open SVC screen module processes the dataset open request using the operating system open module to open the dataset. When, in step 178, the open SVC screen module determines that either one or both of the READ and BDAM BLOCK ID reference sub-labels are not set, in step 172, the open SVC screen module processes the dataset open request using the operating system open module to open the dataset. When, in step 180, the open SVC screen module determines that the dataset is not an extended format physical sequential dataset, in step 172, the open SVC screen module processes the dataset open request using the operating system open module to open the dataset.

Figure 6:
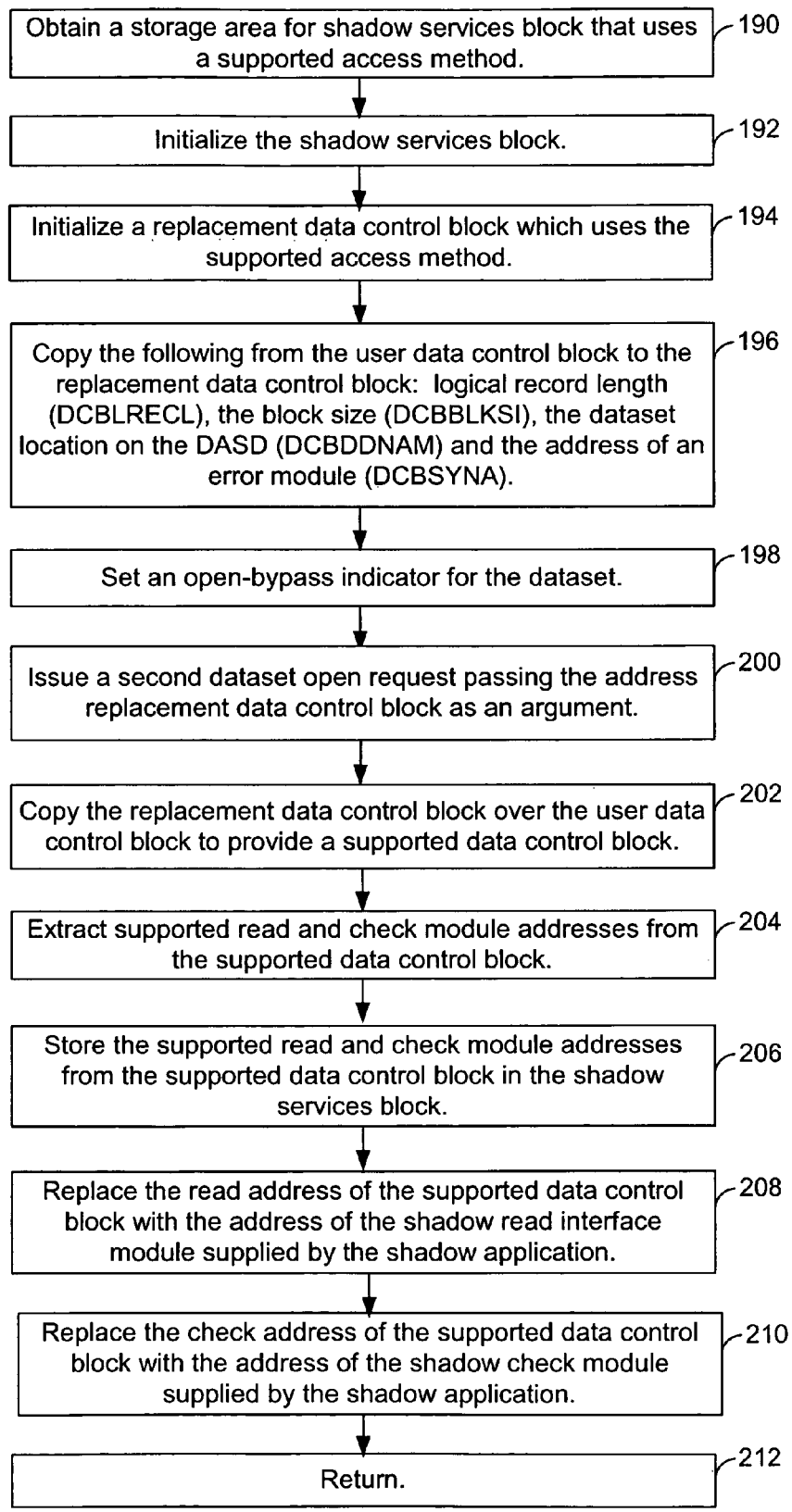
FIG. 6 depicts a more-detailed flowchart of an embodiment of the step of replacing a user data control block with a replacement data control block to provide a supported data control block of the flowchart of FIG. 5.

FIG. 6 depicts a flowchart of an embodiment of the replacing of the data control block of step 182 of FIG. 5. In step 190, the open SVC screen module obtains a storage area for a shadow services block. The shadow services block will be accessed by the shadow read interface module to retrieve information which is acquired by the open SVC screen module. In one particular embodiment, the shadow services block is a BDAM services block (BDSB); however, in other embodiments, the shadow services block is used with other access methods. Typically the shadow services block is stored in a predetermined location in memory. In one embodiment, the shadow services block is stored in a predetermined area of memory which is offset by a predetermined amount from the address of the shadow read interface module. In step 192, the open SVC screen module initializes the shadow services block with default settings.

In step 194, the open SVC screen module builds and initializes a replacement data control block which specifies a supported access method for the dataset. In some embodiments, the replacement data control block is also initialized to contain the address of the shadow read interface module in the read address of the replacement data control block.

In step 196, the open SVC screen module copies the following from the user data control block to the replacement data control block: a logical record length (DCBLRECL), a block size (DCBBLKSI), the location of the dataset on a disk or direct access storage device (DASD) (DCBDDNAM) and the address of an error module (DCBSYNA).

In step 198, the open SVC screen module sets the open-bypass indicator for the dataset to indicate that a subsequent invocation of the open SVC screen module should perform a conventional open.

In step 200, the open SVC screen module issues a second dataset open request passing the address of the replacement data control block as an argument.

The operating system intercepts the second dataset open request and invokes the open SVC screen module, referred to as the second invocation of the open SVC screen module. The second invocation of the open SVC screen module determines that the open-bypass indicator is set (FIG. 5, step 170), and processes the second dataset open request using the conventional operating system open module (FIG. 5, step 172). Upon completion, the second invocation of the open SVC screen module returns to the original invocation of the open SVC screen module. At this point, the operating system has initialized the replacement data control block and the dataset is attached to the shadow application. The operating system has provided addresses of operating system read and check modules, that is, supported read and check modules, among other data, in the replacement data control block.

In step 202, the open SVC screen module copies the replacement data control block over the user data control block. The memory space of the user data control block now contains contents of the replacement data control block, and the user data control block is now referred to as the supported data control block.

In step 204, the open SVC screen module extracts the supported read and check module addresses from the supported data control block. In step 206, the open SVC screen module stores the supported read and check module addresses in the shadow services block.

In step 208, the open SVC screen module replaces the read address in the supported data control block with the address of the shadow read interface module that was supplied by the shadow application. In step 210, the open SVC screen module replaces the check address in the supported data control block with the address of the shadow check module that was supplied by the shadow application. In step 212, the open SVC screen module returns to the user application.

Figure 7:
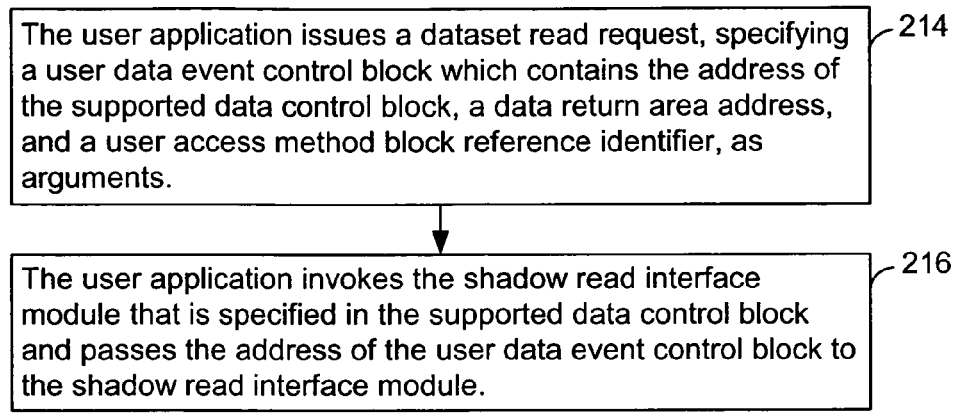
FIG. 7 depicts a high-level flowchart of an embodiment of the user application issuing a read request and invoking the shadow read interface module of FIG. 1.

FIG. 7 depicts a flowchart of an embodiment of issuing a read from the user application in which the user data control block has been replaced with the supported data control block. In step 214, the user application issues a dataset read request, specifying a user data event control block which contains the address of the supported data control block, an address of a data return area, and an access method block reference identifier, as arguments. In a particular embodiment, the user data event control block is a BDAM data event control block which contains the address of a BSAM data control block.

In step 216, the user application invokes the shadow read interface module, which was specified in the supported data control block, and supplies the user data event control block as an argument.

Figure 8A:
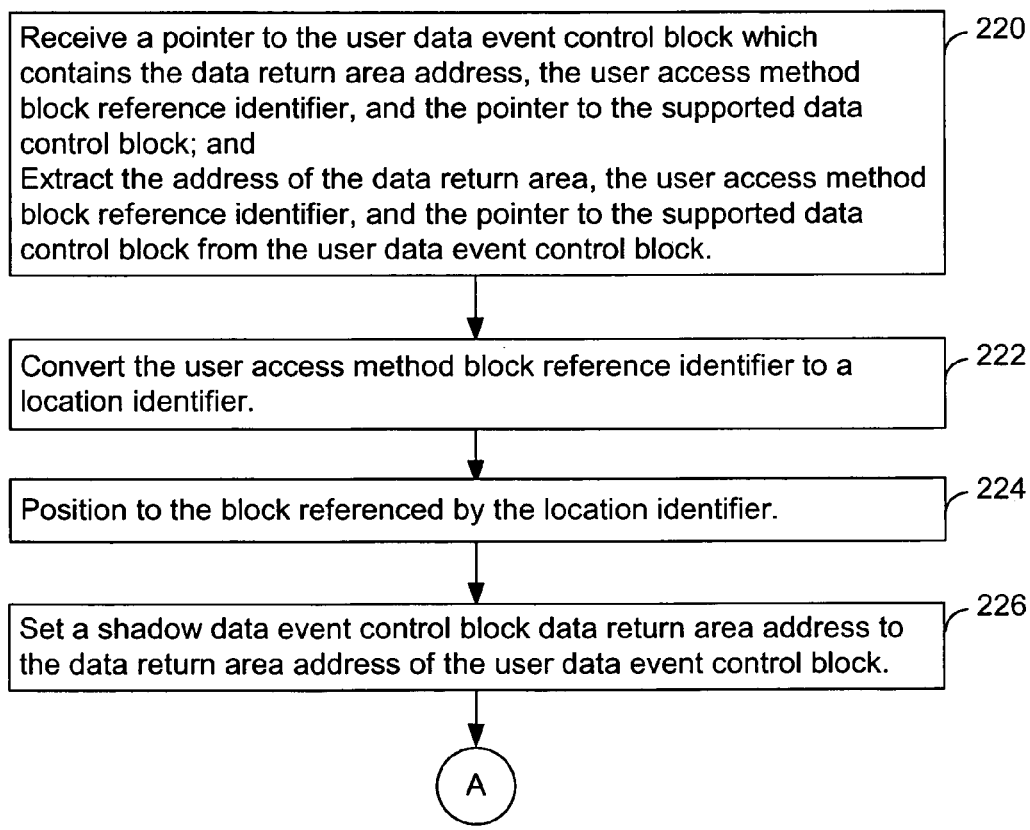
FIGS. 8A and 8B collectively depict a flowchart of an embodiment of the shadow read interface module of FIG. 1.
Figure 8B:
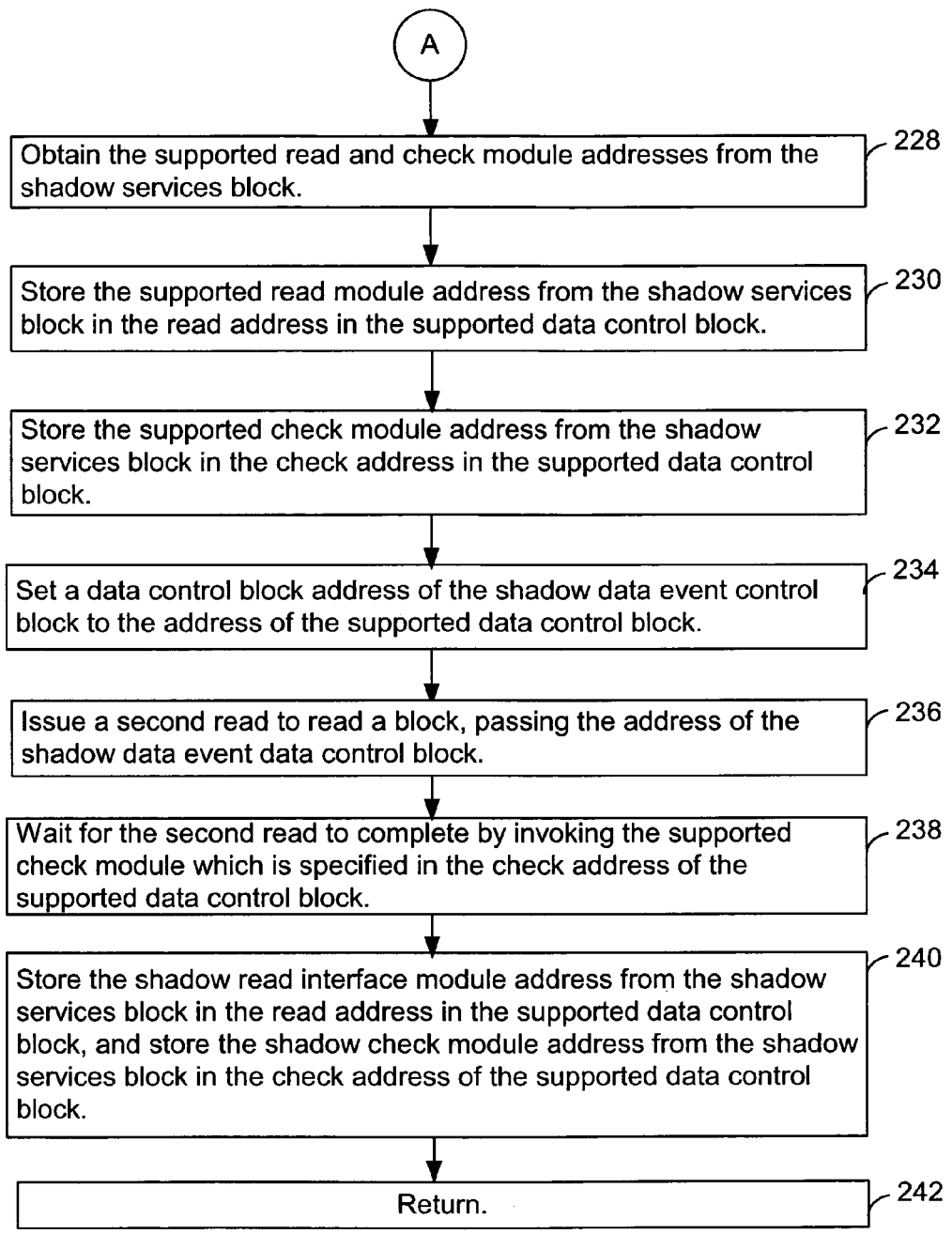

FIGS. 8A and 8B collectively depict a flowchart of an embodiment of the shadow read interface module. In step 220, the shadow read interface module receives a pointer to the user data event control block which contains an address of the data return area, a user access method block reference identifier, and a pointer to the supported data control block. The shadow read interface module extracts the address of the data return area, the user access method block reference identifier, and the pointer to, or address of, the supported data control block from the user data event control block.

In step 222, the shadow read interface module converts the user access method block reference identifier (BRI) to a location identifier. For example, in one embodiment, the user access method block reference identifier is a BDAM BRI and the location identifier is a BSAM block locator token (BLT). The shadow read interface module converts the BDAM BRI to a BSAM BLT as follows:

$$BLT=(BDAM\ BRI+1)*256.$$

In step 224, the shadow read interface module positions to the location identifier. For example, in some embodiments, the shadow read interface module performs a BSAM point to position to the block referenced by the location identifier. In step 226, the shadow the read interface module sets a shadow data event control block data return area address equal to the data return area address of the user data event control block. The flowchart of FIG. 8A proceeds via continuator A to FIG. 8B. In step 228, the shadow read interface module obtains the supported read and check module addresses from the shadow services block.

In step 230, the shadow read interface module stores the supported read module address from the shadow services block in the read address in the supported data control block. In step 232, in some embodiments, the shadow read interface module stores the supported check module address from the shadow services block in the check address of the supported data control block.

In step 234, the shadow read interface module sets the data control block address of the shadow data event control block to the address of the supported data control block.

In step 236, the shadow read interface module issues a second read request to read a block, passing the address of the shadow data event control block. The second read request is performed using the supported read module which is specified in the supported data control block. In one embodiment, the supported read module uses BSAM. In an alternate embodiment, the supported read module may specify other access methods.

In step 238, the shadow read interface module waits for the second read to complete. The shadow read interface module invokes the supported check module which is specified in the supported data control block to determine if the second read request completed.

In step 240, the shadow read interface module stores the addresses of the shadow read interface module and the shadow check module in the read address and check address, respectively, of the supported data control block. In step 242, the shadow read interface module returns to the user application.

The user application invokes the check module which is specified in the user data control block. In particular, the user application invokes the shadow check module. Because the shadow read interface module already performed the check, in some embodiments, the shadow check module performs no actions and returns to the user application.

Figure 9:
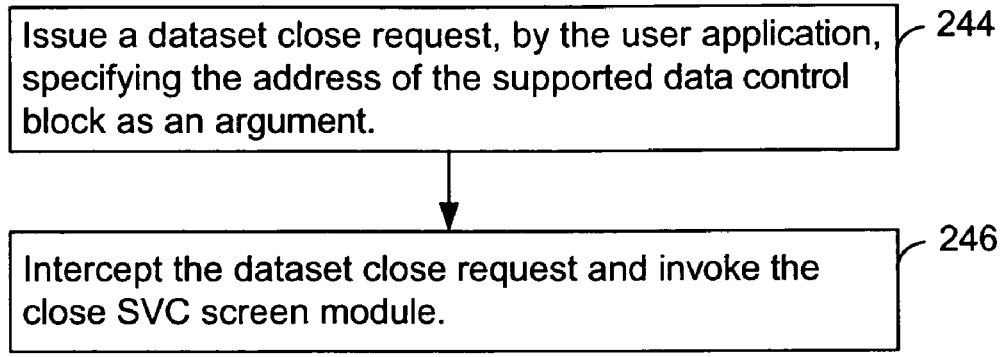
FIG. 9 depicts a flowchart of an embodiment of the user application issuing a dataset close request and the interception of the dataset close request.

FIG. 9 depicts a flowchart of an embodiment of the closing of the dataset. In step 244, the user application issues a dataset close request, specifying the address of the supported data control block as an argument. In step 246, the operating system intercepts the dataset close request, and invokes the close SVC screen module.

Figure 10:
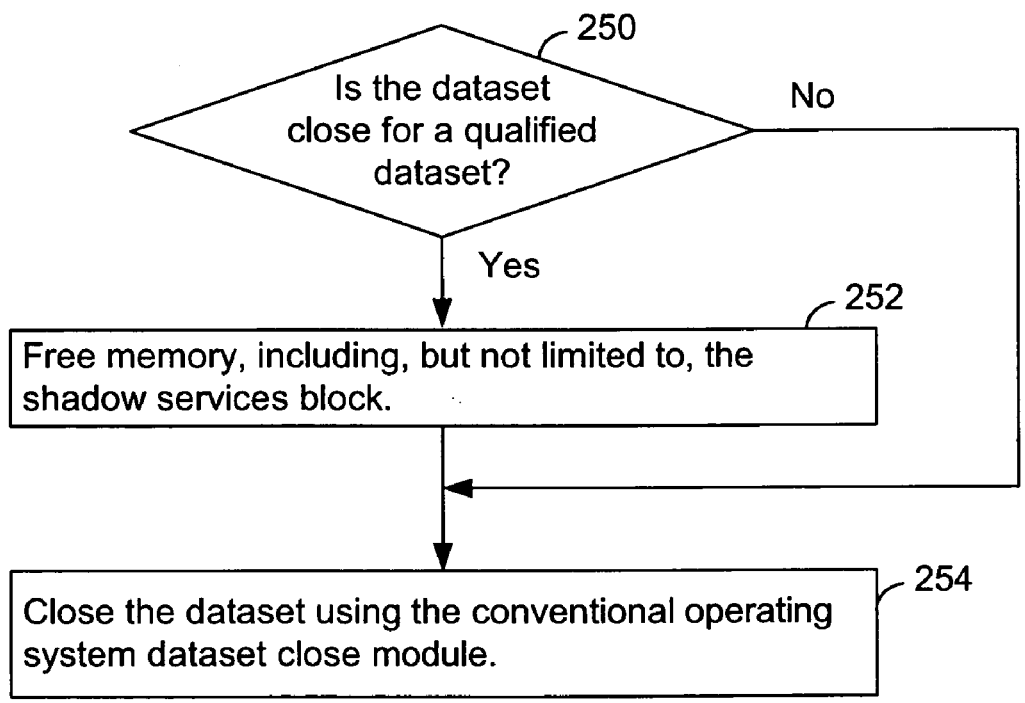
FIG. 10 depicts a flowchart of an embodiment of a close SVC screen module of the shadow application of FIG. 1.

FIG. 10 depicts a flowchart of an embodiment of the close SVC screen module. In step 250, the close SVC screen module determines if the dataset close request is for a qualified dataset which was accessed using the shadow read interface module. If the shadow read interface module has been used to read the dataset, the read address in the data control block points to the shadow read interface module. The shadow read interface module has an architecture such that by inspecting a predetermined offset from the address of the shadow read interface module and identifying a predetermined state of one or more bits at that offset, the close SVC screen module can determine whether the shadow read interface module or the operating system read module was used. When the shadow read interface module was used, the dataset close request is for a qualified dataset.

In an alternate embodiment, the close SVC screen module checks the read address of data control block to determine whether the shadow read interface module was used to read the dataset. In this embodiment, the close SVC screen module compares the read address of the data control block to the address of the shadow read interface module, which in some embodiments is a predetermined address. When the read address of the data control block matches the address of the shadow read interface module, the shadow read interface module was invoked to read the dataset and the dataset close request is for a qualified dataset.

When step 252 determines that the shadow read interface module was used to read the dataset, the close SVC screen module frees memory used by the shadow read interface module, including, but not limited to, the shadow services block. In step 254, the close SVC screen module proceeds to close the dataset using the conventional operating system dataset close module. When, in step 250, the open SVC screen module determines that the operating system read module was used to read the dataset, the open SVC screen module proceeds to step 254.

Figure 11:
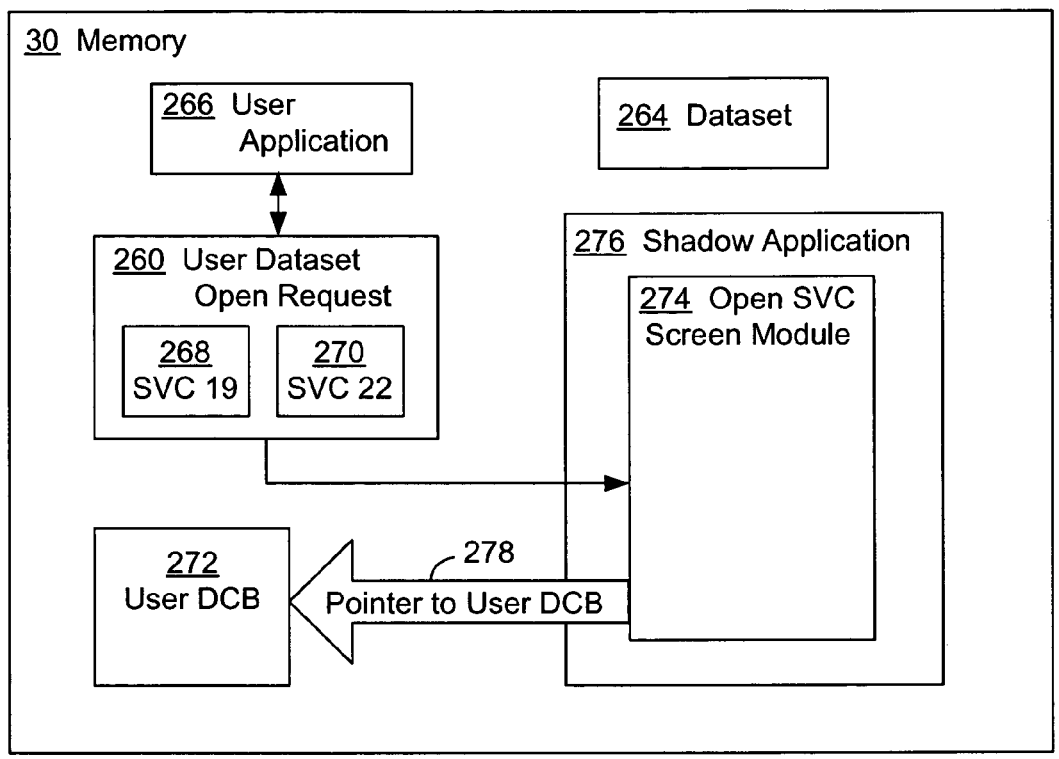
FIG. 11 depicts a block diagram of an embodiment of the memory illustrating a dataset open request intercept in an embodiment of the shadow application of FIG. 1.

A more particular embodiment of the present invention will now be described with reference to FIGS. 11-14. FIG. 11 depicts a block diagram of the memory 30 of FIG. 1 illustrating another embodiment of the intercepting of a dataset open request 260. In response to a user request for data from a dataset 264, a user application program 266 issues the user dataset open request 260 using either an SVC 19 (OPEN) 268 or, alternately, SVC 22 (OPEN TYPE=J) 270. The user dataset open request 260 specifies a user data control block (DCB) 272. The user data control block 272 specifies whether the dataset is being opened for reading or writing.

The operating system intercepts the dataset open request 260 and passes control to the open SVC screen module 274 of the shadow application 276. When the open SVC screen module 274 receives control, the open SVC screen module 274 also receives a pointer 278 to the user data control block 272.

In various embodiments, when the shadow application 276 is executing, the operating system can intercept dataset open requests from many applications for many datasets. Therefore, the open SVC screen module 274 performs dataset qualification to determine whether the dataset open request 260 is for a dataset of interest.

Figure 12:
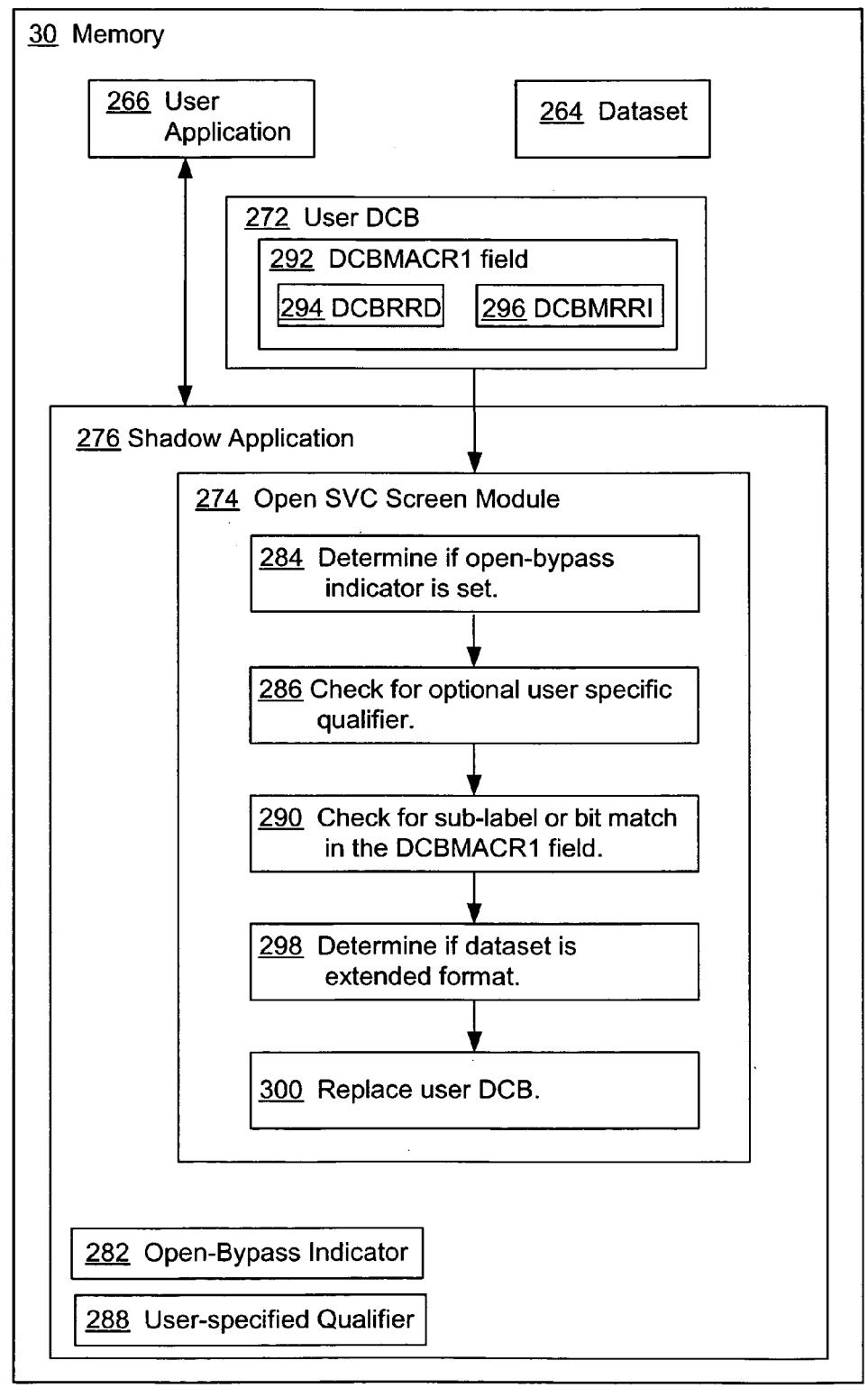
FIG. 12 depicts a diagram of an embodiment of the memory illustrating a technique of qualifying a dataset for replacement of the data control block in an embodiment of the shadow application of FIG. 1.

FIG. 12 depicts a diagram of an embodiment of the memory 30 illustrating an embodiment of a technique to qualify the dataset to determine if the user data control block 272 is to be replaced. In some embodiments, the open SVC screen module 274 obtains access to other related storage areas, 282 and 288, in addition to the user data control block 272 to perform dataset qualification.

In step 284, the open SVC screen module 274 determines whether an open-bypass indicator is set as described above with respect to FIG. 5. When the open-bypass indicator 282 is set, the open SVC screen module 274 processes the dataset open request using the conventional operating system open module. When the open-bypass indicator 282 is not set, the open SVC screen module 274 proceeds with dataset qualification.

Dataset qualification refers to determining whether the data control block that is associated with a dataset should be replaced. For example, in one embodiment, in step 286, the open SVC screen module 274 determines whether the dataset name matches an optional user-specified qualifier 288 as described above with reference to step 176 of FIG. 5.

When the dataset name matches the user-specified qualifier, in step 290, the open SVC screen module 274 checks for a sub-label or bit match in the DCBMACR1 field 292 of the data control block. In the data control block, a DCBMACR1 field 292 has a Read sub-label or bit, called DCBMRRD 294, and a BDAM block identifier reference sub-label or bit, called DCBMRRI 296. The open SVC screen module 274 determines whether the DCBMRRD and DCBMRRI bits, 294 and 296, respectively, are set. If so, in step 298, the open SVC screen module 274 determines if the dataset is an extended format physical sequential dataset. If so, in step 300, the user data control block that was supplied by the user application 266 is replaced with a replacement data control block that uses a supported access method that can access an extended format physical sequential dataset. In a particular embodiment, the user data control block specifies the basic direct access method and the replacement data control block specifies the basic sequential access method.

Figure 13:
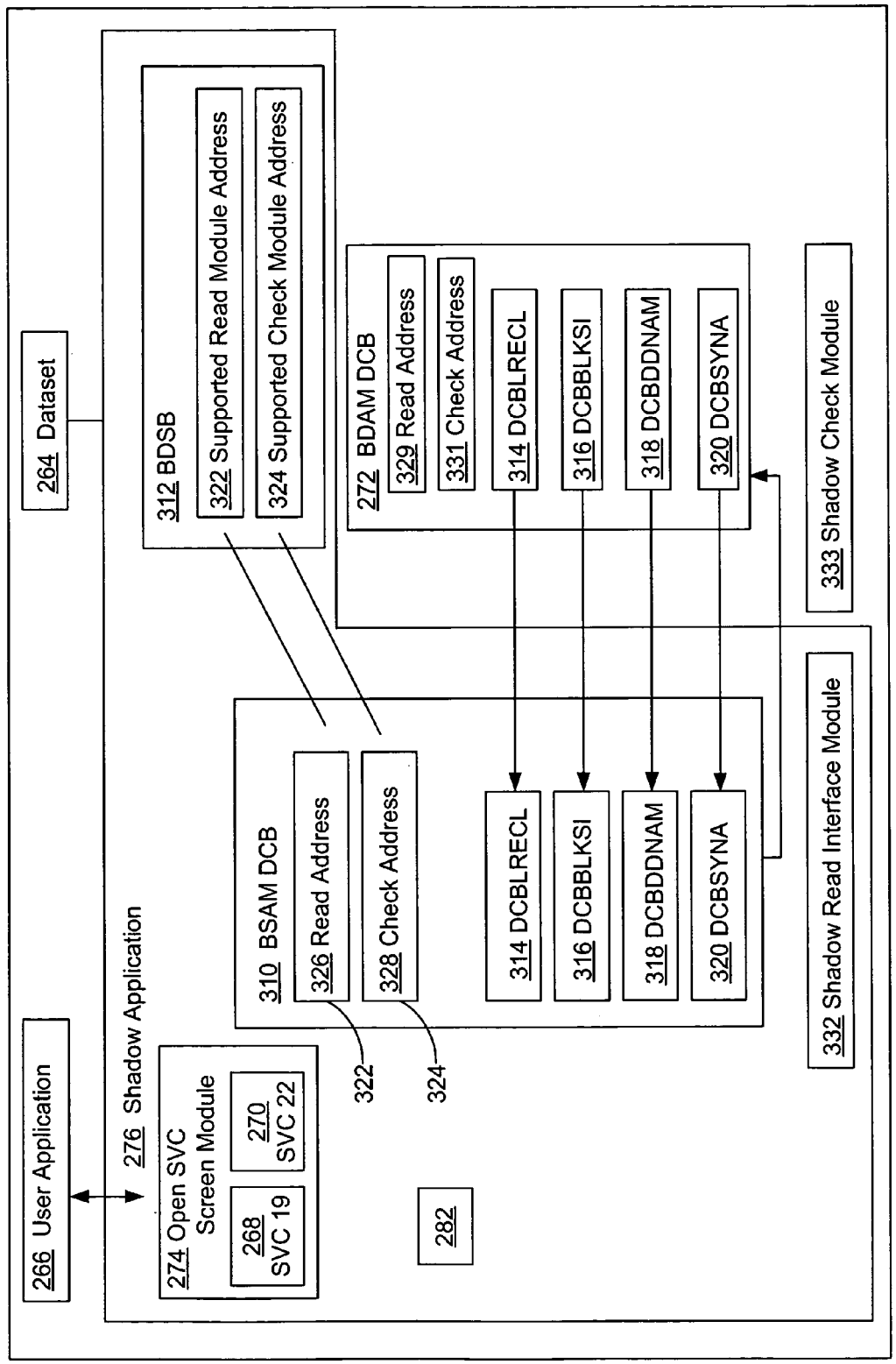
FIG. 13 depicts a diagram of an embodiment of the memory illustrating an embodiment of a technique of replacing the data control block of the shadow application of FIG. 1.

FIG. 13 depicts a diagram of an embodiment of the memory 30 of FIG. 1 illustrating the replacement of the user DCB 272 with a replacement (BSAM) DCB 310 that uses a supported access method. The open SVC screen module 274 obtains a shadow services block, that is, a BDAM Services block (BDSB) 312. The BDSB 312 is a data structure, created by the open SVC Screen module 274. The open SVC screen module 274 initializes the BDSB 274 by setting up pointers and status flags. The open SVC screen module 274 prepares the replacement DCB 310, in this example, a BSAM DCB, for the dataset and stores the address of the BSAM DCB 310 in the BDSB 312. The open SVC screen module 274 copies the logical record length (DCBLRECL) 314, block size (DCBLKSI) 316, a reference to the location of the dataset (DCBDDNAM) 318, and an address of a user-supplied module for error recovery (DCBSYNA) 320 from the BDAM DCB to the BSAM DCB 310.

In some embodiments, the open SVC screen module 274 sets the open-bypass indicator 282 (FIG. 12) to indicate that the next dataset open for this qualified dataset should not replace the DCB. The open-bypass indicator 282 may be implemented using any of the embodiments described above with reference to FIG. 5.

The open SVC screen module 274 then issues a second dataset open request passing the address of the BSAM DCB 310. The operating system intercepts the second dataset open request and invokes the open SVC screen module 274 for a second time. Because the open-bypass indicator 282 is set, the second invocation of the open SVC screen module 274 processes the BSAM DCB 310 using the conventional operating system open module, and returns to the original invocation of the open SVC screen module. The BSAM DCB 310 now contains supported read and check module addresses, 322 and 324, in the read and check addresses, 326 and 328, respectively. The supported read address is associated with an operating system read module that will read data using BSAM. The supported check address is for an operating system check module.

The open SVC screen module 274 extracts the supported read and check module addresses, 322 and 324, respectively, from the BSAM DCB. The open SVC screen module 274 stores the supported read and check module addresses, 322 and 324, respectively, in the BDSB 312. The open SVC screen module 274 copies the BSAM DCB 310 over the BDAM DCB 272 to provide a supported data control block.

The open SVC screen module 274 replaces the read address 329 in the supported data control block 272 with the address of the shadow read interface module 332, and replaces the check address 331 in the data control block 272 with the address of the shadow check module 333. When the open SVC screen module 274 returns to the user application 266, the DCB 272 will be initialized and the dataset 264 will be associated with the shadow application 276.

Figure 14:
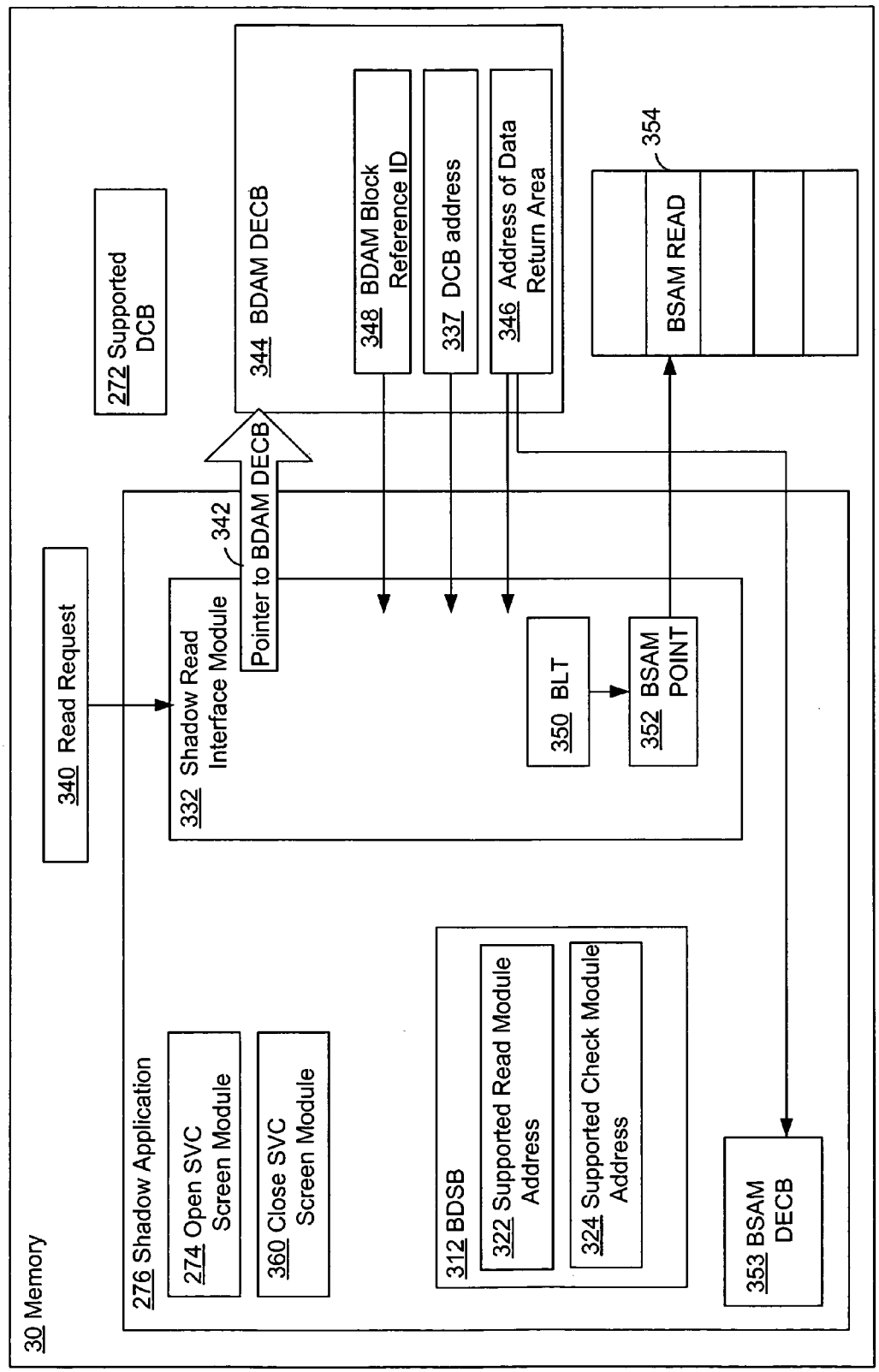
FIG. 14 depicts a diagram of an embodiment of the memory illustrating an embodiment of the operation of the shadow read interface module of the shadow application of FIG. 1.

FIG. 14 depicts a diagram of an embodiment of the memory 30 of FIG. 1 illustrating an embodiment of the shadow read interface module 332 of the shadow application 276. The user application issues a read request 340 to read a block from the dataset 264 (FIG. 12). The user application invokes the shadow read interface module 332 which is specified in the read address in the supported data control block 272 (FIG. 13) and passes a pointer 342 to the user data event control block (DECB) 344 to the shadow read interface module 332. The user DECB 344 is a BDAM DECB which contains the address of the supported DCB 272 in a DCB address 337.

The user DECB 344 is an operating system data structure and contains an address of a data return area 346, a BDAM block reference identifier 348, in addition to the DCB address 337. The data return area 346 is an area in which the retrieved data is stored to return that data to the user application.

The shadow read interface module 332 extracts the address of the data return area 346 and the BDAM block reference identifier 348 from the BDAM DECB 344. The block reference identifier 348 is an address used in BDAM access. BSAM access uses a block locator token 350. The shadow read interface module 322 converts the block reference identifier to a block locator token by adding one to the block reference identifier and multiplying the resulting value by 256.

The shadow read interface module 322 uses a BSAM POINT request 352 to position to the block 354 specified by the block locator token 350. The block locator token 350 is supplied as an input to the BSAM POINT request 352. After positioning to the block 354, the shadow read interface module initializes a shadow or BSAM DECB 353 to contain the address of the data return area 346 from the DECB 344 specified by the user application. The BSAM DECB 353 is also initialized to contain the address 337 of the supported DCB 272. The shadow read interface module copies the supported read and check module addresses, 322 and 324, respectively, from the BDSB 312 to the read and check addresses of the supported DCB 272. The shadow read interface module 332 issues a dataset read passing the address of the shadow or BSAM DECB 353 and invokes the supported read module. The shadow read interface module 332 issues a check using the supported check module address in the supported DCB 272 to wait for the read to complete. After the read completes, the shadow read interface module 332 copies the addresses of the shadow read interface module and shadow check module to the read and check module addresses in the supported DCB 272. The shadow read interface module 322 returns to the user application which issued the original read request 340.

The user application issues a check which invokes the shadow check module which is specified in the supported DCB 272.

The user application now issues a file close. The operating system intercepts the file close and passes control to the close SVC screen module 360, described above. When the shadow read interface module was used to read the data, the close SVC screen module releases the BDSB and closes the dataset.

In various embodiments, the present inventive technique may also be used to write data to a dataset using an unsupported access method. To write data to a dataset, FIGS. 2, 4 and 5 are modified. In FIG. 2, step 126 issues a write request. In step 128, the check request determines whether the write request completed.

In FIG. 4, in step 156, the data is written to the dataset in accordance with the supported access method specified by the supported data control block. Step 158 determines whether the write completed by invoking a supported check module.

In FIG. 5, step 178 checks whether a write sub-label is set. In FIG. 6, in step 204, a supported write module address is extracted. In step 206, the supported write module address is stored in the shadow services block. In step 208, the write address of the supported data control block is replaced with the address of the shadow write interface module.

In FIG. 7, in step 214, the user application issues a dataset write request, and passes an address of a data-to-write area. The data-to-write area contains at least one block of data to write to the dataset. In step 216, the user application invokes the shadow write interface module.

Figure 15A:
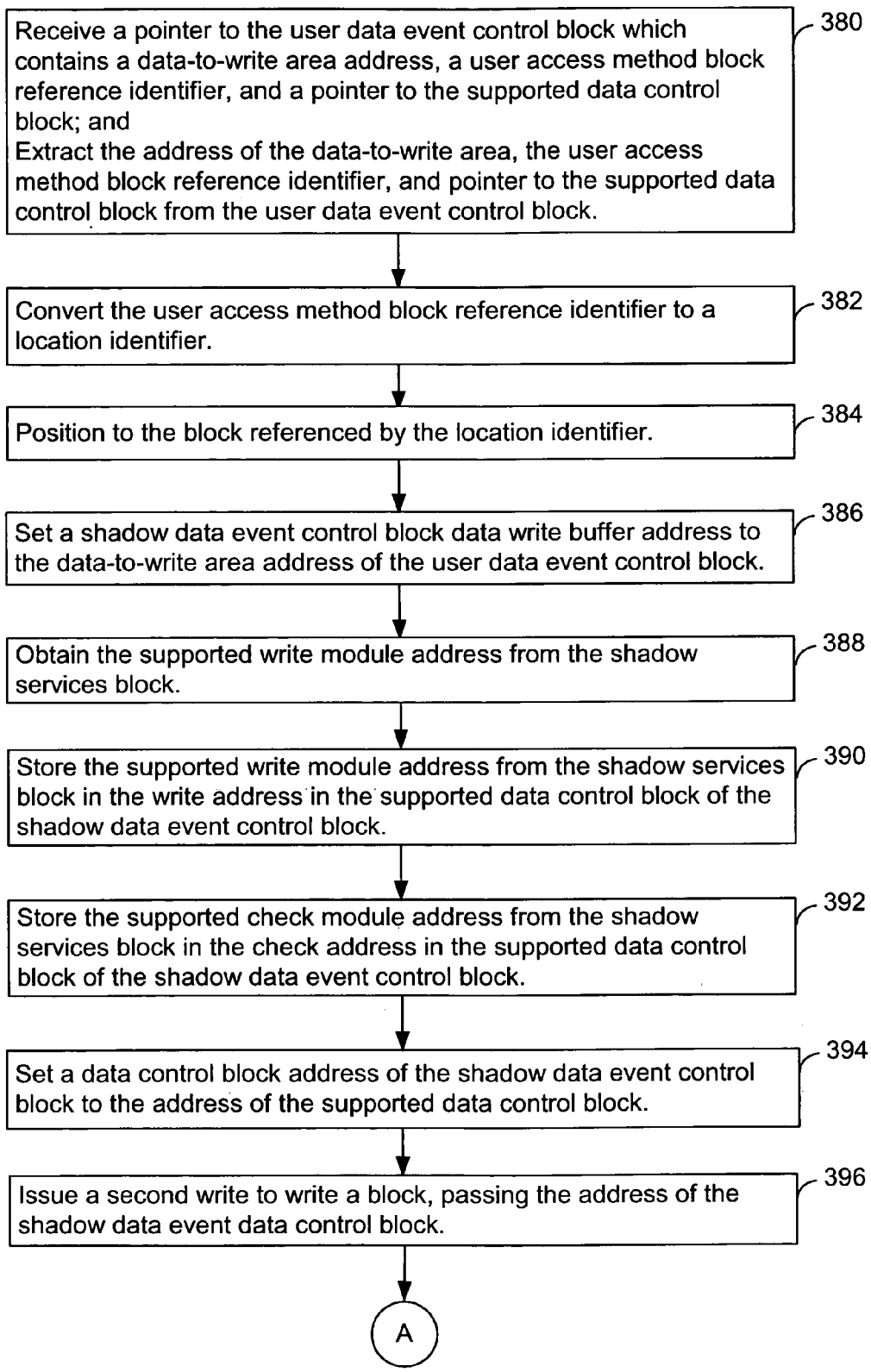
FIGS. 15A and 15B collectively depict a flowchart of an embodiment of a shadow write interface module of the shadow application of FIG. 1.
Figure 15B:
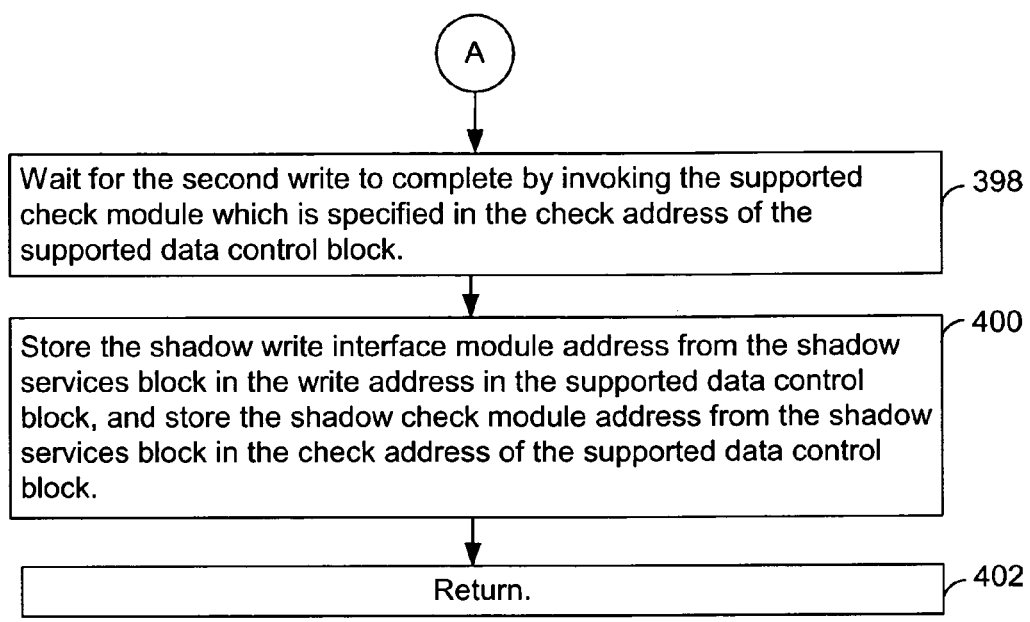

FIGS. 15A and 15B collectively depict a flowchart of an embodiment of a shadow write interface module of FIG. 1. In step 380, the shadow write interface module receives a pointer to the user data event control block that contains an address of a data-to-write area, an access method block reference identifier, and a pointer to the supported data control block. The shadow write interface module extracts the address of the data-to-write area, the access method block reference identifier, and pointer to the supported data control block.

In step 382, the shadow write interface module converts the access method block reference identifier to a location identifier. In step 384, the shadow write interface module positions to the block referenced by the location identifier. In step 386, a shadow data event control block write buffer address is set to the data-to-write address of the user data event control block. In step 388, the supported write module address is obtained from the shadow services block. In step 390, the supported write module address from the shadow services block is stored in the write address in the supported data control block. In step 392, the shadow write interface module stores the supported check module address from the shadow service block in the check address in the supported data control block of the shadow data event control block. In step 394, the shadow write interface module sets a data control block address of the shadow data event control block to the address of the supported data control block. In step 396, the shadow write interface module issues a second write request to write a block, passing the address of the shadow data event control block address as an argument. In particular, the shadow write interface module invokes the supported write module which is specified in the write address in the supported data control block. The flowchart of FIG. 15A proceeds via continuator A to FIG. 15B. In step 398, the shadow write interface module waits for the write to complete by invoking the supported check module which is specified in the check address of the supported data control block. In step 400, the shadow write interface module stores the address of the shadow write module and address of the shadow check module in the write and check addresses, respectively, of the supported data control block. In step 402, the write interface module returns to the user application.

The various embodiments of the present inventive technique enable applications that use non-extended format physical sequential datasets to take advantage of extended format physical sequential dataset and features such as data striping and compression. In a more particular embodiment, archive logs can be defined as extended format physical sequential datasets and data striping can be used to increase the speed of reading and writing an archive log. Alternately, DFSMS compression can be used to reduce the amount of space used by an archive log.

Various embodiments of the present inventive technique have been described with respect to replacing a user data control block which specifies BDAM, and a supported data control block which specifies BSAM. In other embodiments, the user data control block can specify substantially any access method, including and not limited to BSAM and QSAM, and the supported access method is different from the access method specified in the user data control block.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended thereto.

What is claimed is:

1. A method of accessing a dataset stored on at least one disk, comprising:
intercepting an open request to access the dataset, the dataset being an extended format physical sequential dataset, the open request being associated with a first data structure that specifies a first access method, the first access method being a basic direct access method, the first access method not being supported for the extended format physical sequential dataset;
replacing the first data structure with a second data structure that specifies a second access method which is different from the first access method, the second access method being a sequential access method, the second access method being supported for the extended format sequential dataset; and
accessing the dataset stored on the at least one disk in accordance with the second access method of the second data structure.

2. The method of claim 1 wherein the open request specifies that the dataset is to be opened for reading, and said accessing reads from the dataset in accordance with the second access method.

3. The method of claim 1 wherein the open request specifies that the dataset is to be opened for writing, and said accessing writes to the dataset in accordance with the second access method.

4. The method of claim 1 further comprising:
specifying an access interface module to access the dataset, wherein said accessing is performed by the access interface module.

5. The method of claim 1 wherein the first data structure is a first data control block, and the second data structure is a second data control block.

6. The method of claim 1 wherein the second data structure contains an address of a shadow access interface module, and said accessing also invokes the shadow access interface module, the shadow access interface module receiving the address of the second data structure, and
invoking, by the shadow access interface module, a supported access module to access the dataset in accordance with the second access method.

7. The method of claim 1 further comprising:
qualifying the dataset to determine whether the first data structure is to be replaced based on the dataset being an extended format physical sequential dataset and the specified access method being the basic direct access method; and
in response to said qualifying that the first data structure is to be replaced, issuing another dataset open request to open the dataset using the second access method.

8. The method of claim 1 further comprising:
in response to said intercepting the open request to access the dataset, invoking an open screen module;
issuing, by the open screen module, another open request, the another open request being associated with the second data structure, wherein the second access method is specified in the second data structure;
intercepting the another open request;
in response to said intercepting the another open request, invoking the open screen module; and
in response to the open screen module determining that the another open request is to be processed using an operating system open module, processing the another open request using an operating system open module to open the dataset using the supported access method.

9. An apparatus for accessing a dataset stored on at least one disk, comprising:
a processor; and
a memory storing one or more instructions to be executed by the processor that:
intercepts an open request to access the dataset, the dataset being an extended format physical sequential dataset, the open request being associated with a first data structure that specifies a first access method, the first access method being a basic direct access method, the first access method not being supported for the extended format physical sequential dataset;
replaces the first data structure with a second data structure that specifies a second access method which is different from the first access method, the second access method being a sequential access method, the second access method being supported for the extended format physical sequential dataset; and
accesses the dataset stored on the at least one disk in accordance with the second access method of the second data structure.

10. The apparatus of claim 9 wherein the open request specifies that the dataset is to be opened for reading, and said one or more instructions also read from the dataset in accordance with the second access method.

11. The apparatus of claim 9 wherein the open request specifies that the dataset is to be opened for writing, and said one or more instructions also write to the dataset in accordance with the second access method.

12. The apparatus of claim 9 wherein the first data structure is a first data control block, and the second data structure is a second data control block.

13. The apparatus of claim 9, wherein said one or more instructions also specify an access interface module to access the dataset, the access interface module comprising said one or more instructions to access the dataset.

14. The apparatus of claim 9 wherein the second data structure contains an address of a shadow access interface module, and said one or more instructions that access also invoke the shadow access interface module, the shadow access interface module receiving the address of the second data structure, and said one or more instructions also invoke, by the shadow access interface module, a supported access module to access the dataset in accordance with the second access method.

15. The apparatus of claim 9, said one or more instructions also:
qualify the dataset to determine whether the first data structure is to be replaced based on the dataset being an extended format physical sequential dataset and the specified access method being the basic direct access method; and
in response to a determination that the first data structure is to be replaced, issue another dataset open request to open the dataset using the second access method.

16. The apparatus of claim 9, said instructions also:
in response to said interception of the open request, invoke an open screen module;
issue, by the open screen module, another open request, the another open request being associated with the second data structure, wherein the second access method is specified in the second data structure;

intercept the another open request;
in response to the intercepting of the another open request, invoke the open screen module; and
in response to a determination by the open screen module that the another open request is to be processed using an operating system open module, process the another open request using an operating system open module to open the dataset using the supported access method.

17. An article of manufacture comprising a computer usable storage medium embodying instructions executable by a computer for performing a method of accessing a dataset stored on at least one disk, the method comprising:
intercepting an open request to access the dataset, the dataset being an extended format physical sequential dataset, the open request being associated with a first data structure that specifies a first access method, the first access method being a basic direct access method, the first access method not being supported for the extended format physical sequential dataset;
replacing the first data structure with a second data structure that specifies a second access method which is different from the first access method, the second access method being a sequential access method, the second access method being supported for the extended format physical sequential dataset; and
accessing the dataset stored on the at least one disk in accordance with the second access method of the second data structure.

18. The article of manufacture of claim 17 wherein the open request specifies that the dataset is to be opened for reading, and said accessing reads from the dataset in accordance with the second access method.

19. The article of manufacture of claim 17 wherein the open request specifies that the dataset is to be opened for writing, and said accessing writes to the dataset in accordance with the second access method.

20. The article of manufacture of claim 17 wherein the first data structure is a first data control block and the second data structure is a second data control block.

21. The article of manufacture of claim 17, said method further comprising:
specifying an access interface module to access the dataset, wherein said accessing is performed by the access interface module.

22. The article of manufacture of claim 17 wherein the second data structure contains an address of a shadow access interface module, and said accessing also invokes the shadow access interface module, the shadow access interface module receiving the address of the second data structure, said method further comprising:
invoking, by the shadow access interface module, an operating system access module to access the dataset in accordance with the second access method.

23. The article of manufacture of claim 17, said method further comprising:
qualifying the dataset to determine whether the first data structure is to be replaced based on the dataset being an extended format physical sequential dataset and the specified access method being the basic direct access method; and
in response to said qualifying that the first data structure is to be replaced, issuing another dataset open request to open the dataset using the second access method.

24. The article of manufacture of claim 17, said method further comprising:
in response to said intercepting said open request, invoking an open screen module;
issuing by the open screen module, another open request, the another open request being associated with the second data structure, wherein the second access method is specified in the second data structure;
intercepting the another open request;
in response to said intercepting the another open request, invoking the open screen module; and
in response to the open screen module determining that the another open request is to be processed using an operating system open module, processing the another open request using an operating system open module to open the dataset using the supported access method.

25. An article of manufacture comprising a computer usable storage medium embodying instructions executable by a computer for performing a method of accessing a dataset stored on at least one disk, the method comprising:
intercepting an open request to access the dataset, the open request being associated with a first data control block that specifies an unsupported access method for the dataset;
in response to said intercepting, invoking an open screen module, the open screen module issuing a second open request to open the dataset using a supported access method for the dataset, the supported access method being specified in a second data control block;
intercepting the second open request;
in response to said intercepting the second open request, invoking the open screen module;
in response to the open screen module determining the second open request is to be processed using a operating system open module, processing the second open request using the operating system open module to open the dataset using the supported access method, and providing an address of a supported access module;
replacing, by said open screen module, the first data control block with a second data control block that specifies the supported access method;
storing an address of a shadow access interface module in the second data control block; and
accessing the dataset by invoking the shadow access interface module, and the shadow access interface module invoking the supported access module using the address of the supported access module, to access the dataset in accordance with the second access method.

26. The article of manufacture of claim 25 wherein the open request specifies that the dataset is to be opened for reading, and said accessing reads from the dataset in accordance with the second access method.

27. The article of manufacture of claim 25 wherein the open request specifies that the dataset is to be opened for writing, and said accessing writes to the dataset in accordance with the second access method.

28. The article of manufacture of claim 25, said method further comprising:
qualifying, by the open screen module, the dataset to determine whether the first data control block is to be replaced based on the specified access method not being supported for the dataset.

29. The article of manufacture of claim 25 wherein said qualifying further comprises:
determining whether the dataset is of a type that is not supported by the first access method.

30. The article of manufacture of claim 25 further comprising:
intercepting a close request to close the dataset; and
executing a close screen module to close the dataset.

31. The article of manufacture of claim 25 wherein the unsupported access method is a basic direct access method, and the supported access method is a sequential access method.

32. The article of manufacture of claim 25 wherein the dataset is an extended format physical sequential dataset.

* * * * *